March 5, 1935. H. W. FLETCHER 1,993,269
PIPE JOINT AND METHOD OF CONSTRUCTING THE SAME
Filed March 9, 1931
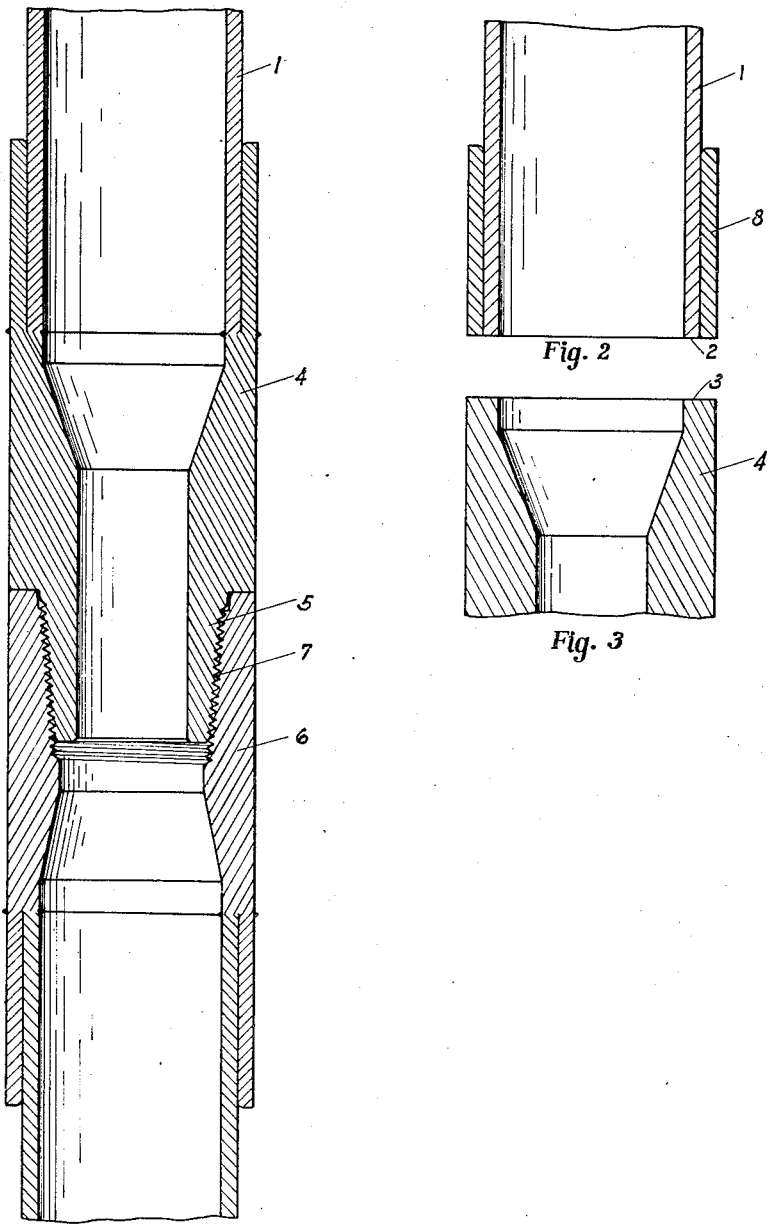
HAROLD W. FLETCHER INVENTOR

UNITED STATES PATENT OFFICE 1,993,269

PIPE JOINT AND METHOD OF CONSTRUCTING THE SAME

Harold W. Fletcher, Houston, Tex., assignor to Hughes Tool Company, Houston, Tex., a corporation of Texas Application March 9, 1931, Serial No. 521,103

6 Claims. (Cl. 29—148.2)

My invention relates to joints for pipes but has particular application to tool joints for use on drill stem employed in well drilling by the rotary method.

Drill stem must be of strong and durable construction, due to the fact that it is subjected to high twisting torque in rotating the drill, and the sections of the drill stem must be unscrewed and again connected when the drill is withdrawn from the hole. It has become customary in handling drill stem to screw tool joints on the meeting ends of the drill stem sections, said joints serving to withstand the wear of repeated screwing up and unscrewing when the drill stem is handled in drilling. These tool joints include a pin member and a box member, each of which has a threaded socket at one end for connection with the ends of the pipe sections. These sockets are subjected to heavy torsional strains in drilling and are flexed to some extent in the drilling operation, so that eventually they are liable to leakage and wear by the erosion of the flushing mud. Many tool joints fail because of this wear and have to be replaced.

It is an object of my invention to provide a construction of tool joint, whereby the tool joint may become in effect an integral part of the pipe, and all danger from leakage and wear between the joint and the pipe practically eliminated.

The invention includes the method by means of which the tool joint is constructed and attached to the pipe joint.

I aim to do away with the threaded connection between the joint members and the drill pipe, and provide a strong and sturdy construction which will withstand the heavy duty to which it is subjected.

I also aim to do this in a simple and economical manner, which will be a practicable manufacturing operation.

In the drawing herewith, Fig. 1 is a central longitudinal section through a tool joint embodying my invention.

Fig. 2 is a section through the broken lower end of a pipe section with the reinforcing collar thereon.

Fig. 3 is a broken section of the upper end of a tool joint member.

The pipe sections 1 which are employed are unthreaded and have their ends faced off squarely at 2 to abut against the end 3 of the tool joint member 4.

The tool joint member may be either a pin member 5 or a box member 6, both of which are threaded for connection at 7 in the usual manner. The outer diameter of the joint members is larger than is that of the pipe, thus providing a shoulder at 3 which projects outside the area with which the pipe contacts.

Outside the pipe, at each end I employ a reinforcing collar 8 which fits the pipe closely and has its end faces off squarely with the pipe to fit against the shoulder 3 on the joint member. Its outer periphery is then flush with the outer periphery of the tool joint.

The pipe and collar are then welded to the tool joint by any preferred manner. I contemplate, for example, the welding of the pipe and collar to the tool joint by electric flash welding in which the meeting ends are subjected to the heat of the arc and then forced tightly together and allowed to cool somewhat, and then I subject the union to further heating from the electric current to obtain the proper steel structure of the joints and then allow the weld to cool. In this way, I obtain a firm union of the pipe and collar to the joint and a heat treatment of the material thereafter. It is to be understood, however, that other welding processes may be used.

When thus welded, the connection appears approximately as shown in Fig. 1, the pipe and collar being, in effect, integral parts of the tool joint. The joint is not removable from the pipe, except by cutting with a torch or otherwise, and will not be subject to wear and leakage due to flushing fluid as is now the case with threaded connections.

It will be seen that this joint is a simple and economical construction and will eliminate many of the objectionable features experienced with tool joints in recent years.

The reinforcing collar has the effect of reducing stress concentration, due to the flexing of the pipe. This is important, as it is found that breakage of the pipe with threaded joints almost invariably occurs in the last engaged thread at the coupling. This is true even where the pipe is upset for greater strength at the ends. In my joints, there are no threads, and the reinforcing collar prevents flexing of the pipe at the weld, and a strong durable joint results. Such a joint has no leaks, no expense for upsetting of the pipe is necessary. It eliminates threading of the pipe, and the joint is as strong as the pipe itself.

What I claim as new is:

1. A device of the character described including tubular drill stem sections, a tool joint including a tapered threaded pin member and a box member having a tapered threaded socket to receive said pin member, each of said tool joint members having its ends remote from said pin and socket formed with a plane shoulder, collars fitted over the ends of each of said drill stem sections and both said sections and said collars secured integrally with a pin member at one end of said section and a box member at the other end thereof.

2. A tubular drill stem section, collars fitting over the ends of said section, a taper threaded pin member at one end of said section, a box member at the other end of said section, said box having a threaded socket tapered to receive a tapered pin member, said collars and said section being welded integrally with the ends of said pin and box members in the manner described.

3. A tool joint and drill stem combined including a tubular pin member with one end tapered and threaded, the other end having a plane shoulder, a box member with a tapered threaded socket to receive said pin and a plane shoulder at its outer end and a collar about the ends of said pipe section, said collars and the ends of sections being secured integrally to said shoulders on said members, one end to a pin member and the other end to a box member.

4. A method of connecting together tubular drill stem sections comprising fitting a reinforcing metal collar about the ends of the section, forming a tapered threaded tool joint member and then butt-welding the ends of said drill stem section and collar to the ends of said tool joint members remote from their taper threaded ends.

5. A method of making an integral drill tube coupling including forming a tool joint member with tapered inner surfaces, forming tapered threads on the interfitting ends of the joint members, outwardly reinforcing the ends of the said drill tube sections by metal collars, and then butt-welding said drill pipe section and said collars to the ends of said tool joint members remote from their threaded ends.

6. The method of making an integral drill stem coupling, comprising forming a tool joint member with tapered box and pin cooperating ends thereon, forming threads on the interfitting ends of said tapered box and pin, outwardly reinforcing the end of the drill stem section by a metal collar and then butt-welding said drill pipe section and collar to said tool joint member, and then heat treating the welded portion.

HAROLD W. FLETCHER.